UNITED STATES PATENT OFFICE.

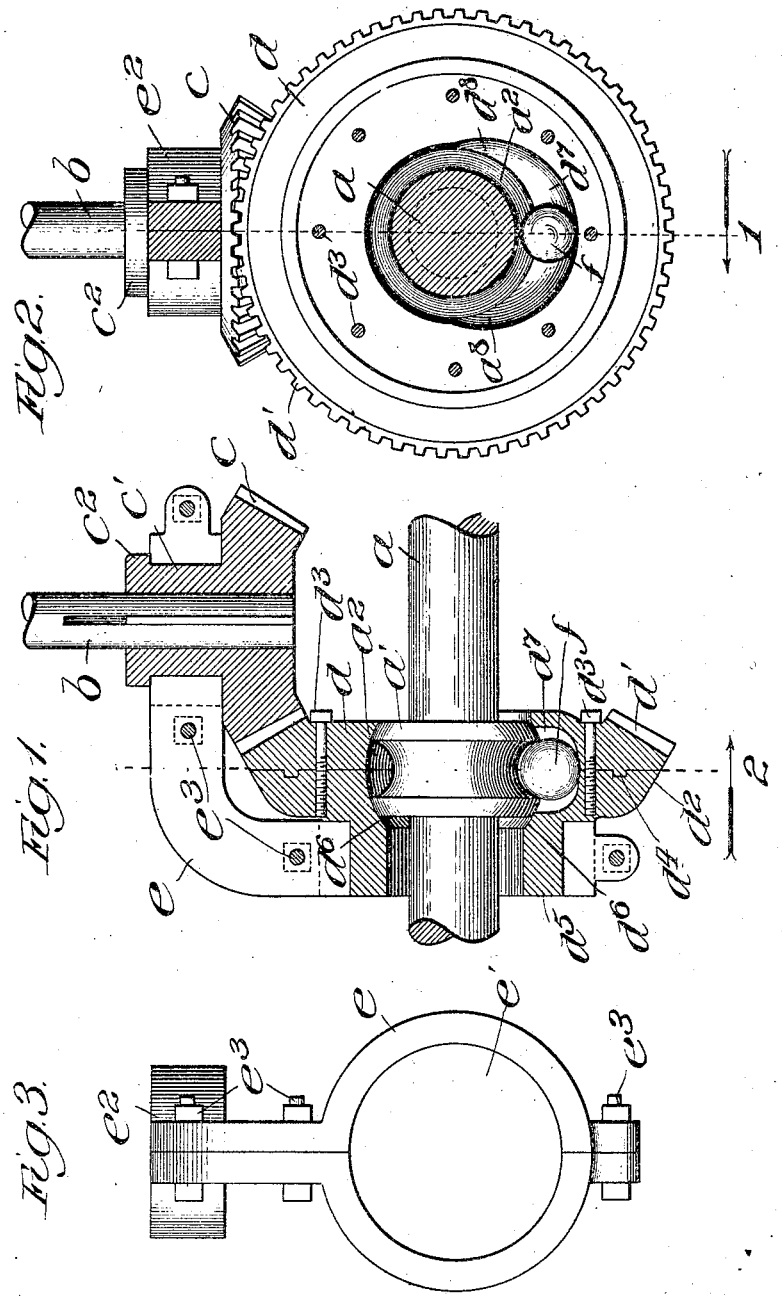

SPENCER OTIS, OF CHICAGO, ILLINOIS, ASSIGNOR TO NATIONAL PATENT HOLDING COMPANY, OF RAPID CITY, SOUTH DAKOTA, A CORPORATION OF SOUTH DAKOTA.

REVERSIBLE CLUTCH.

946,262.

Specification of Letters Patent.   Patented Jan. 11, 1910.

Application filed April 20, 1906.   Serial No. 312,818.

*To all whom it may concern:*

Be it known that I, SPENCER OTIS, a citizen of the United States, residing at Chicago, in the county of Cook and State of Illinois, have invented certain new and useful Improvements in Reversible Clutches, of which the following is a specification.

My invention relates to reversible clutches, and has for its object to provide a clutch of this character, whereby a driven shaft may be so connected to the driving mechanism as to be driven in either direction, or may be allowed to run free from the driving mechanism under some conditions.

To this end my invention consists in the combination and details hereinafter set forth and claimed.

In the drawing—Figure 1 is a longitudinal elevation, partly in section, of my improved clutch, the section being taken on the line 1 of Fig. 2. Fig. 2 is a sectional view on the line 2 of Fig. 1. Fig. 3 is a detail view in elevation, showing the supporting frame for the gears.

In the drawing, $a$ represents a driven shaft and $b$ a driving shaft, the driving and the driven shafts being provided with intermeshing beveled gears $c$ and $d$, respectively. The gear $c$ is loosely mounted in a ring $e^2$ of a supporting frame $e$, which may form part of a rigid supporting structure—this frame will be hereinafter more fully described—and the gear $c$ is keyed to the driving shaft $b$, so as to rotate therewith. The gear $d$ is formed in two parts $d'$ $d^2$ secured together by any suitable fastening means, such as bolts $d^3$, and provided with complementary projections and recesses on the inner or engaging faces to keep the same in engagement. The section $d'$ is provided with the usual gear teeth. The section $d^2$ is provided with a journal portion $d^5$ loosely mounted to rotate in the ring $e'$ of the frame $e$.

In order to connect and disconnect the gear $d$ to the driven shaft $a$ and consequently connect this driven shaft to the driving mechanism, I provide a suitable clutch, as follows: The driven shaft is provided with a collar $a'$ having a circumferential recess $a^2$, while the gear $d$ is centrally bored to receive this collar portion. It will be observed that the faces $d^6$ in this central bore are formed in the arc of a circle, the radius of which, or rather the center of which, is at the center of the driven shaft, and that the edges of the collar portion have the same radius. Thus there is formed a ball and socket joint, permitting universal movement of the driven shaft. This inner face of the bore is formed with a wedge-shaped recess $d^7$, forming two oppositely extending wedge portions $d^8$, the widest portion of this recess being at the intermediate point. This wedge-shaped portion is countersunk in the inner face of the gear, as shown in Figs. 1 and 2. In this recess and resting between the inner face of the gear and the outer face of the grooved portion of the collar on the driven shaft is a wedging member, shown here as a ball $f$. The frame $e$ is formed of two similar parts, which, when united by bolts $e^3$, form a frame having an upper ring $e^2$ and a lower ring $e'$, for receiving the gears $c$ and $d$ above described.

It will now be understood that when the parts are at rest in the position shown in Fig. 2, the ball or wedge member $f$ will rest in the lowermost portion of the wedge-shaped recess $d^7$, the distance between the wall of the recess and of the grooved collar being wider at this point than the diameter of the wedging member. As the driving shaft is turned, by any suitable motor, this ball will be carried to one side or the other of this central point, depending upon the direction of the rotation of the shaft, and will take the position in one of the narrow portions $d^8$ of the wedge-shaped recess, thus causing the gear $d$ and the driven shaft to be locked together, as will be readily understood. It will thus be seen that I have provided a means whereby the driven shaft may be driven in either direction, according as the driving shaft turns in one direction or the other.

It will be understood that this clutch is of general application, but if used upon a motor wagon, or a motor car, when the speed of the driven shaft exceeds that of the driving shaft, as, for instance, when the car is running downhill, the wedge member will assume its intermediate position, allowing the driven shaft to run free, and this is true regardless of the direction in which the car may be moving. I have provided a clutch mechanism, therefore, which may be used in motor cars to drive the car in either direction, or to allow the wheels to run free of the driving mechanism.

I claim:

1. A clutch comprising a driven shaft provided with a circumferential collar having the shape of a sphere-segment with an equatorial groove thereon, a driving wheel having a concave spherical shape mounted on said collar, and means for the driving wheel to drive the shaft either way without permitting the shaft to drive the said wheel.

2. A clutch comprising two rotatable members having interfitting spherical surfaces, one of said members being provided with a chamber tapering at its ends toward the other member, and a clutch roller in said chamber.

3. A clutch comprising two rotatable members having interfitting spherical surfaces, one of said members being split circumferentially into two parts, means for securing said parts together, one of said spherically interfitting members being provided with a chamber tapering at its ends toward the other member, and a clutch roller in said chamber.

4. A clutch comprising two rotatable members having interfitting spherical surfaces, the convex spherical member being annularly grooved, the concave spherical member being provided with a chamber tapering at its ends toward the other member, a clutch roller in said chamber, the concavely spherical member being split circumferentially into two parts, and means for securing said parts together.

SPENCER OTIS.

Witnesses:
ANNIE C. COURTENAY,
W. T. JONES.